(12) United States Patent
Grundon et al.

(10) Patent No.: US 6,611,905 B1
(45) Date of Patent: Aug. 26, 2003

(54) MEMORY INTERFACE WITH PROGRAMABLE CLOCK TO OUTPUT TIME BASED ON WIDE RANGE OF RECEIVER LOADS

(75) Inventors: Steven Alfred Grundon, Jericho, VT (US); Bruce Gerard Hazelzet, Essex Junction, VT (US); Mark William Kellogg, Essex Junction, VT (US); James Lewis Rogers, Milton, VT (US)

(73) Assignee: International Business Machines Corporation, Armonk, NY (US)

( * ) Notice: Subject to any disclaimer, the term of this patent is extended or adjusted under 35 U.S.C. 154(b) by 102 days.

(21) Appl. No.: 09/607,139

(22) Filed: Jun. 29, 2000

(51) Int. Cl.⁷ .............................................. G06F 12/00
(52) U.S. Cl. ........................ 711/167; 711/115; 711/105; 713/400; 713/401; 710/22; 710/25
(58) Field of Search ................................ 711/104, 105, 711/167, 115; 713/401, 400, 500, 502, 600; 710/22, 25

(56) References Cited

U.S. PATENT DOCUMENTS

| | | | | |
|---|---|---|---|---|
| 5,406,518 A | * | 4/1995 | Sun et al. | 365/194 |
| 5,577,236 A | * | 11/1996 | Johnson et al. | 711/5 |
| 5,642,487 A | * | 6/1997 | Flynn et al. | 711/197 |
| 5,652,733 A | * | 7/1997 | Chen et al. | 365/233 |
| 5,655,113 A | | 8/1997 | Leung et al. | |
| 5,781,766 A | | 7/1998 | Davis | |
| 5,892,927 A | | 4/1999 | Boehmer et al. | |
| 5,909,701 A | * | 6/1999 | Jeddeloh | 365/193 |
| 5,917,761 A | * | 6/1999 | Tietjen et al. | 365/194 |
| 5,933,039 A | | 8/1999 | Hui et al. | |
| 5,946,712 A | | 8/1999 | Lu et al. | |
| 5,953,243 A | * | 9/1999 | Capps et al. | 365/52 |
| 6,003,118 A | | 12/1999 | Chen | |
| 6,060,916 A | * | 5/2000 | Park | 327/293 |
| 6,088,774 A | * | 7/2000 | Gillingham | 365/194 |
| 6,131,149 A | * | 10/2000 | Lu et al. | 711/167 |
| 6,182,253 B1 | * | 1/2001 | Lawrence et al. | 365/201 |
| 6,185,664 B1 | * | 2/2001 | Jeddeloh | 711/167 |
| 6,253,284 B1 | * | 6/2001 | Hsu | 326/30 |
| 6,292,903 B1 | * | 9/2001 | Coteus et al. | 713/401 |
| 6,397,312 B1 | * | 5/2002 | Nakano et al. | 365/193 |
| 6,446,180 B2 | * | 9/2002 | Li et al. | 711/167 |

* cited by examiner

*Primary Examiner*—Matthew Kim
*Assistant Examiner*—Zhuo H. Li
(74) *Attorney, Agent, or Firm*—Margaret A. Pepper

(57) ABSTRACT

A data processing system, and a method of operating a data processing system. The data processing system comprises a clock generator for generating a system clock signal, and a memory unit having a plurality of memory modules for storing data. The data processing system further comprises a memory controller coupled to the clock generator for receiving the system clock signal therefrom, and coupled to the memory modules for outputting memory address and control signals to said modules. The memory controller is programmable to have different clock-to-output delays, on signals from the memory controller end, based on the memory installed in the system. Preferably, the memory controller includes means for generating a series of memory address and control signals in response to receiving the system clock signal, and for outputting the memory address and control signals to the memory modules; and programmable means for determining time delays between the time the memory controller receives the system clock signal and the time the memory means outputs the memory address and control signals.

19 Claims, 5 Drawing Sheets

EXAMPLE DDR MEMORY STRUCTURE:
3 DIMM, 184 PIN (UNBUFFERED) IMPLEMENTATION

3 CLOCK PAIRS (184 PIN UNBUFFERED DIMMS)

FEEDBACK

BUS STRUCTURE:

-ADDRESS BUS 'A' CONNECTS TO DIMMS #0 AND #1, ADDRESS BUS 'B' CONNECTS TO DIMM #2

-CS (CHIP SELECTS) AND CKE (CLOCK ENABLE) CONNECT TO ONE DIMM EACH
-DATA CONNECTS TO ALL DIMMS

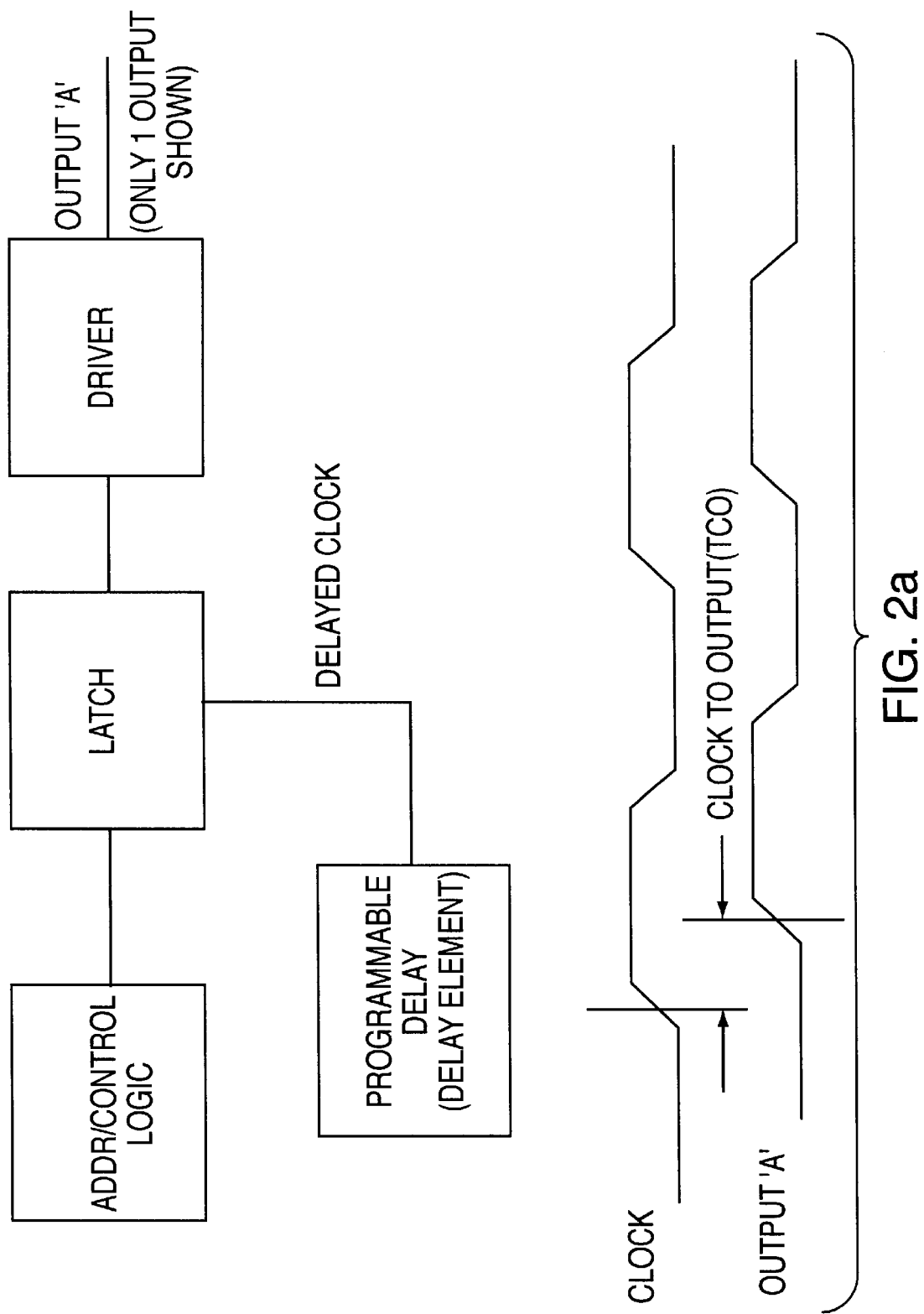

MEMORY INTERFACE WITH PROGRAMABLE CLOCK TO OUTPUT TIME BASED ON WIDE RANGE OF RECEIVER LOADS

BACKGROUND OF THE INVENTION

This invention generally relates to high speed memory subsystems, and more specifically, to high speed memory subsystems that operate with a wide range of memory loads.

Current memory subsystems operate address and command busses in a manner that is synchronous to a fixed system clock with all memory locations receiving the same clock (possibly with a fixed offset) independent of the memory installed at that location. In pluggable memory systems, such as those using memory modules such as 'DIMMs' (Dual Inline Memory Modules), the actual number of memory devices in a particular pluggable position might range from as few as two to as many as 18 or more devices (if using Unbuffered DIMMs with ×32, ×16 or ×8 devices). Since the load is varying, but the clock arrival is fixed, it becomes increasingly difficult to ensure an adequate window of time, at high speeds, for when the addresses must be valid if they are to be captured by the clock.

Various methods are currently used to address this problem.

One method (1) is to:

Operate the address bus at 2× the clock period (ensure a new valid address every $2^{nd}$ clock, rather than every clock cycle). This is the most widely adopted solution today, and decreases system performance while minimizing the benefit of emerging high speed memory devices.

Another solution (2) is:

the use of 'Registered' DIMMs: On these DIMMs, the addresses are re-driven a cycle later, from a driver on the memory module. This also reduces overall system performance (adds one clock of latency), but does permit a new address every clock (since the overall loading on the system bus is reduced). This solution is currently used in high-end systems, and is being planned by most low-end PC's since they know of no other viable option.

Another method (3) for addressing the above-discussed problem is the use of registers on the system board: This is the same solution as described in (2), but with the space and cost for the registers incurred by the system-rather than by the memory module supplier (and end-customer). As such it is rarely desirable.

Another method (4) for addressing the problem is the use of delayed clocks. Currently, systems may set the memory device clocks with a fixed delay to either slightly lead or lag the system clock to improve general timings. It would be theoretically possible to add logic complexity to the system to further gate these clocks based on the memory loading, but this would be very difficult to accomplish without the addition of significant skew or jitter error, and it would not be possible to independently adjust the clock arrival time in reference to specific signals on the DRAM (only one clock input per DRAM). Hence this solution is not viable, and has not been applied.

Still another method (5) for addressing the above-described problem is to use programmable drive strength drivers: This feature is becoming widely used as a method of matching the drive strength to the load. The predominant purpose for this feature is to ensure the fastest possible transition times and propagation delays in a given application, without violating overshoot, undershoot, or setup and hold transition times of the receiver. This method can also be used, to a limited extent, to help close timings on signals from the memory interface to the memory devices. Unfortunately, the driver sizing is limited in regard to the current available to the driver, the simultaneous switching effects in the driver package, the overshoot and undershoot specs on the receiver, etc. In addition, maximizing drive strength has only a limited benefit in reducing a signal delay. At some point, the driver must be switched earlier in order to gain further performance.

SUMMARY OF THE INVENTION

An object of this invention is to provide a high speed memory subsystem that operates with a wide range of memory loads.

Another object of the present invention is to provide a memory interface device (memory controller/chipset or signal re-drive device) that is programmable to have different clock-to-output delays, on signals from the memory controller end, based on the memory installed in the system at time of power-up.

These and other objectives are attained with a data processing system, and a method of operating a data processing system, comprising a clock generator for generating a system clock signal, and a memory unit having a plurality of memory modules for storing data. The data processing system further comprises a memory controller coupled to the clock generator for receiving the system clock signal therefrom, and coupled to the memory modules for outputting memory clock signals to said modules. The memory controller is programmable to have different clock-to-output delays, on signals from the memory controller end, based on the memory installed in the system.

Preferably, the memory controller includes means for generating a series of memory clock signals in response to receiving the system clock signal, and for outputting the memory clock signals to the memory modules. This preferred memory controller also includes programmable means for determining time delays between the time the memory controller receives the system clock signal and the time the memory controller outputs the memory clock signals. With this preferred embodiment, the memory controller is programmed by computing the load of each of the memory modules. More specifically, the memory subsystem has a plurality of slots for receiving the memory modules, and the load of the memory modules is computed by accessing each memory slot to determine if memory is plugged in, the type of memory installed, and to determine the number of modules the controller needs to drive. Also, for example, the memory modules may be pluggable dual inline memory modules.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 2 (a), shows clocked outputs to memory with an optional delay element.

DETAILED DESCRIPTION OF THE PREFERRED EMBODIMENTS

Figure 1:
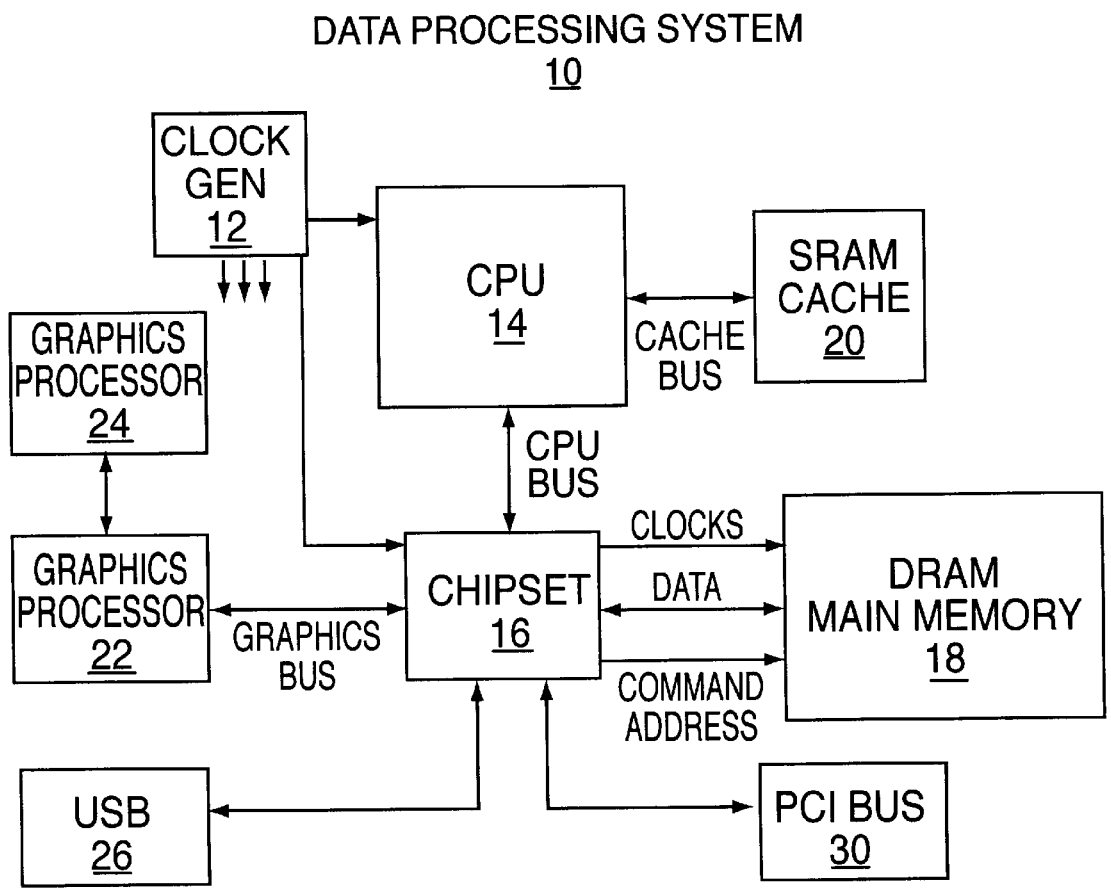
FIG. 1, shows a memory architecture that may be used in the implementation of this invention.

FIG. 1 is a simplified block diagram of a data processing system 10, that may be used in the practice of the present invention. A clock generator 12, which is connected to CPU 14, also provides low skew clock signals for a memory control chip 16, and other system components. Memory controller 16, includes a write data buffer (not shown) for data write and a read data buffer for data read. The system of FIG. 1 also includes an SRAM cache 20, graphic processor 22, frame buffer 24, and busses 26 and 30.

In the operation of system 10, Data are transmitted between memory 18, and memory controller 16, in accordance with command signals for data read/write operations. In particular, for a read cycle, the clock signal triggers the read data buffer so that upon the arrival of data from the DRAM, there will be sufficient setup time for correct data strobe. Similarly, for a write cycle, the clock signal triggers the DRAM so that upon arrival of data from the write data buffer, there will be sufficient setup time for correct data strobe.

Figure 2:
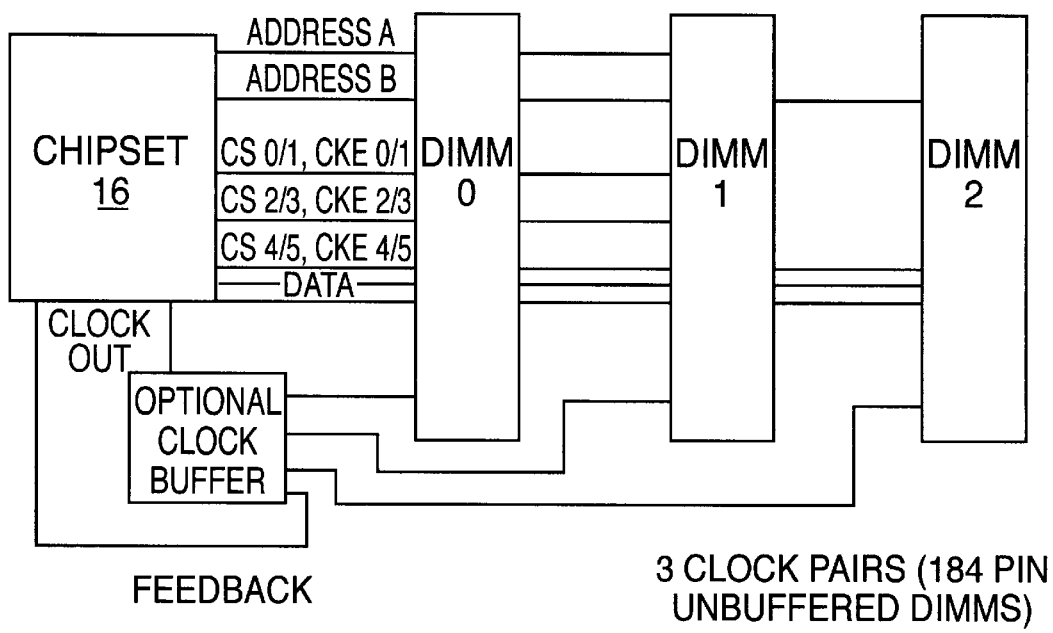
FIG. 2, shows an example of a DDR memory structure.

FIG. 2, shows an example of a DDR memory structure. However, for some applications one could have clocked outputs to memory with an optional delay element, as clearly seen in FIG. 2(a).

Figure 3:
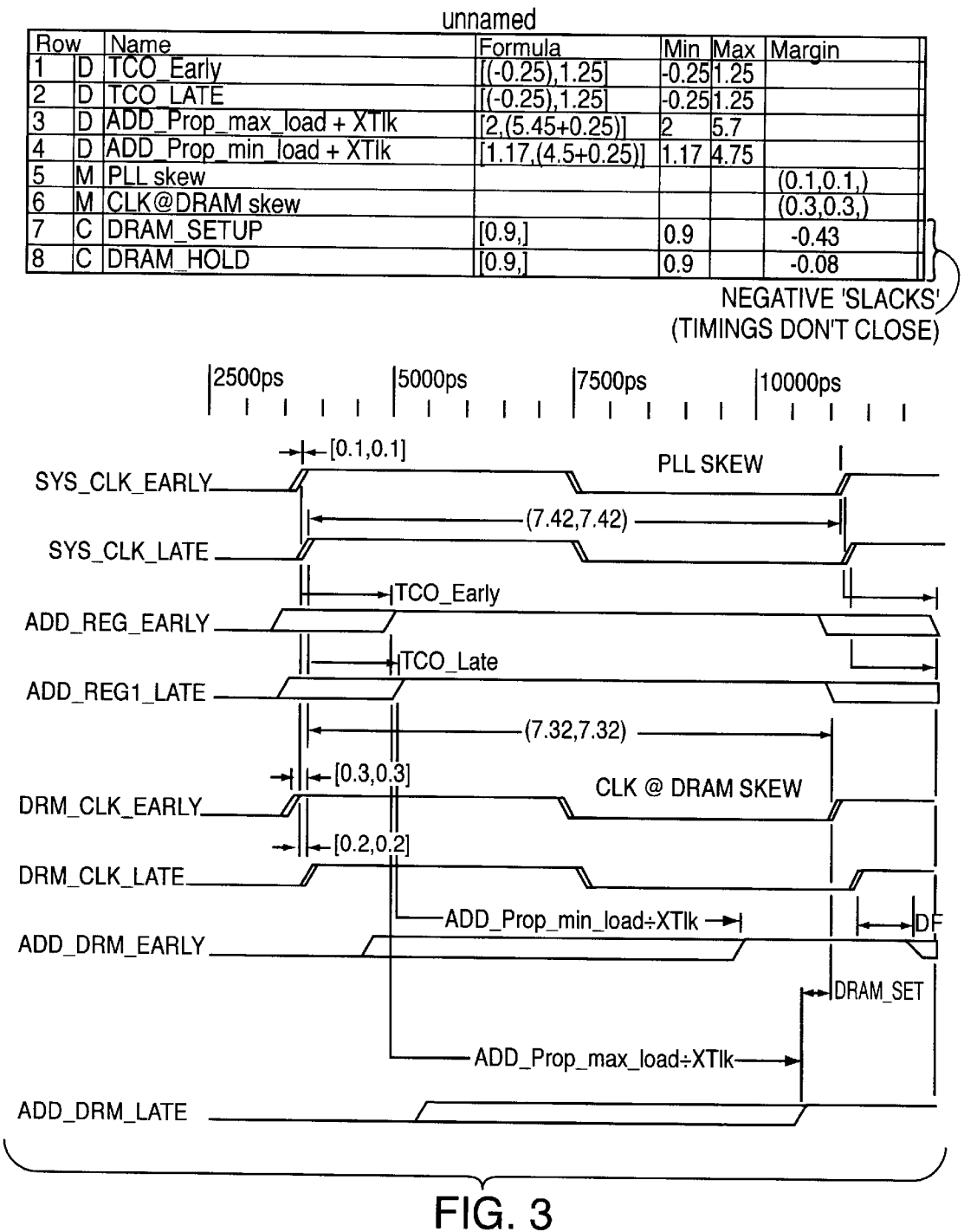
FIG. 3, is a timing diagram showing various signals used when addressing memory devices.

FIG. 3, is a timing diagram showing various signals used when addressing memory devices. It should also be appreciated that the non-adjusted TCO results in missed DRAM-Setup and DRAM-Hold timings (negative margin).

Figure 4:
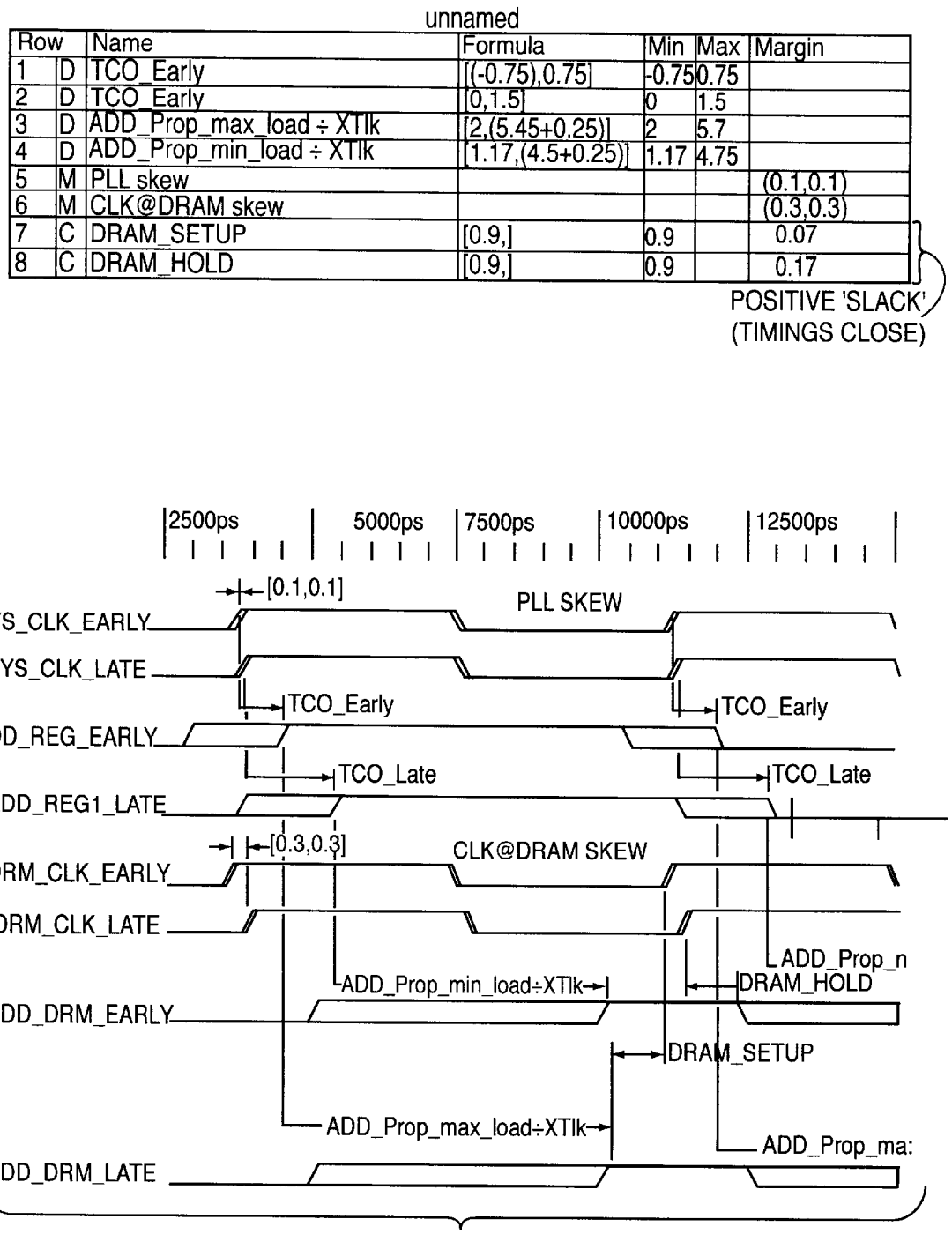
FIG. 4, is a timing diagram showing various signals used with a memory subsystem embodying the present invention.

FIG. 4, is a timing diagram showing various signals used with a memory subsystem embodying the present invention. As one can clearly see that the adjusted TCO results in meeting the DRAM-Setup and DRAM-Hold timings (positive margin).

Computer systems use Dynamic Random Access Memory (DRAM) as a means of data storage. The processor for a computer system uses address, control and data busses which are not directly compatible with DRAM address, control and data busses. A memory controller is the interface between CPU address, control and data busses and the DRAM address, control and data busses. SDRAMs are synchronous DRAMS that use a clock to synchronize the capture of address, controls and data, as well as write data back to the memory controller. Double Data Rate DRAMs (DDR DRAMs) are the latest generation DRAMs to be used for random access memory in Personal Computers. DDR DRAMs also use a system generated clock to synchronize the DRAM operations with the system.

Personal Computers typically have memory data busses that are 64 bits wide, with some also including 8 bits for Error Correction Code (ECC). The standard memory board design for this type of memory is the Dual Inline Memory Module (DIMM). Personal Computers generally have several memory board connectors, to plug DIMM boards, which provides the option of having various size memory configurations. DIMMs, DRAMs, SDRAMs, and DDR DRAMs and their interfaces are well known in the industry. One application of this invention is associated with the need for timing closure in Personal Computers using DDR DRAMs and the JEDEC industry standard 184 pin DDR DIMM (although the invention is much more broadly applicable).

With reference to FIGS. 1–4, one of the key aspects for any synchronous systems is the transfer of data from one latch to the next. All synchronous systems use clocks to launch signals and clocks to capture signals. In a memory subsystem of a DDR DRAM-based computer, the memory controller will send address and commands to the DRAM using a clock to launch these signals and the DRAM will use a clock to capture the signals.

In an SDRAM system, data reads and writes would also be directly related to the system clock, whereas DDR-based systems include a data clock within each group of 4 or 8 data bits. Because these systems are based on clock edges, the address and control signals must reach the destination latches prior to the clock plus some setup and hold time. To accommodate various memory device configurations DIMMs are designed with as few as 2 DRAM devices and as many as 18 DRAM devices per DIMM (the minimum and maximum loads are reflected in the terms EARLY and LATE, as clearly shown in FIGS. 3 and 4). This wide variation in loads can create a situation where the timing margin (setup and hold) for the DRAM devices is negative, as clearly illustrated in FIG. 3.

The solution to this problem, in accordance with this invention, is to control this problem at the device that is sending the address and control signals, as discussed with reference to FIG. 2. One of the key parameters of synchronous devices is their clock to output time. This is the time required by the device to place a signal at the output pin in relationship to the input of a clock edge. Clock to output times are generally fixed values with a tolerance for variations in processes, temperature, and voltage.

This clock to output time need not be a fixed value, but can be a programmable time. This makes timings across a wide variation of loads possible. A programmable clock to output time provides the flexibility to adjust the output signal time in relationship to the clock according to the load conditions.

With reference to FIG. 4, for a heavily loaded signal net, the fastest clock to output time (TCO) is required to meet setup time constraints at the DRAM. A lightly loaded net may have hold time constraints. Hold time may be helped by introducing a delay element in the address and control output path, as clearly shown in FIG. 2(a).

Slowing the output relationship to the clock internal to the memory controller improves HOLD timing margins at the DRAM.

In a DDR system, memory controllers use clk and –clk. This provides more accurate resolution for timing issues internal to the memory controller. With this finer resolution, it is possible to send address and control data to the output prior to the actual clock. This is possible if the internal timings of the memory controller are running faster than the speed of the output signal, or if the internal clock is shifted in time via a delay element (such as a DLL (Delay-Locked-Loop)).

Some control lines have less load than other address or control lines due to the DIMM architecture. Clock Enable and Chip Select nets often have half the load of other address and control lines. Using a variable tap delay, these clock to output times can be adjusted independent of the other control lines providing a better margin at the DRAM.

This invention can be applied to any clocked system where the receiver/receivers are a variable load that can be determined and the clock to output adjusted for in the driving device.

Solutions that exist today for this problem include multiple strength drivers or shifting the clock to the receiving device. Multiple strength drivers are required, in any case, to accommodate this wide variation in loads. This is the only way to maximize signal integrity and maintain a reasonable signal amplitude at the receiver. Shifting the clock at the DRAM in relationship to the system clock can help to improve timings for a heavy load such as address or control signals. The problem with this technique is that the clock has a relationship to both lightly loaded data and heavily loaded address or control signals. Shifting the clock may improve address and control timings, while adding delay to the data path and making data capture on reads more difficult. This is especially true since data loads are typically small compared to address and control signals.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A data processing system, comprising:
    a clock generator for generating a system clock signal;
    a memory unit having a plurality of memory modules for storing data; and
    a memory controller coupled to the clock generator for receiving the system clock signal therefrom, and coupled to the memory modules for outputting memory clock signals to said modules, wherein the memory controller is programmable to have different clock-to-output delays, by delaying address and control signals to the memory unit, based on the memory loading installed in the system.

2. A data processing system according to claim 1, wherein the memory controller includes:
    means for generating a series of address and control signals in response to receiving the system clock signal, and for outputting the address and control signals to the memory modules; and
    programmable means for determining time delays between the time the memory controller receives the system clock signal and the time the memory means outputs the address and control signals.

3. A data processing system according to claim 2, wherein the memory controller is programmed by computing the load of each of the memory modules.

4. A data processing system according to claim 3, wherein the memory unit has a plurality of slots for receiving the memory modules, and the load of the memory modules is computed by accessing each memory slot to determine if memory is plugged in, to determine the number and type of modules the controller needs to drive.

5. A data processing system according to claim 1, wherein the memory modules are pluggable dual inline memory modules.

6. A data processing system according to claim 1, wherein the memory controller includes:
    means for generating a series of data for SDR memory in response to receiving the system clock signal, and for outputting the data for SDR memory to the memory modules; and
    programmable means for determining time delays between the time the memory controller receives the system clock signal and the time the memory means outputs the data for SDR memory.

7. A data processing system according to claim 1, wherein the memory controller is programmable to have different clock-to-output delays based on the number of memory modules installed in the system.

8. A method of operating a data processing system of the type having a memory unit having a plurality of memory modules for storing data, and a memory controller coupled to the memory modules for outputting memory address and control signals to said modules, the method comprising the steps:
    generating a system clock signal;
    receiving the system clock signal at the memory controller; and
    programming the memory controller to have different clock-to-output delays, by delaying address and control signals to the memory unit, based on the memory loading installed in the system.

9. A method according to claim 8, wherein:
    the memory controller includes (i) means for generating a series of memory address and control signals in response to receiving the system clock signal, and (ii) means for outputting the memory address and control signals to the memory modules; and
    the programming step includes the step of determining time delays between the time the memory controller receives the system clock signal and the time the memory controller sends out the memory address and control signals.

10. method according to claim 9, wherein the programming step includes the step of computing the load of each of the memory modules.

11. A method according to claim 10, wherein the memory unit has a plurality of slots for receiving the memory modules, and the computing step includes the step of addressing each memory slot to determine if memory is plugged in, to determine the number and type of modules the controller needs to drive.

12. A method according to claim 8, wherein the memory modules are pluggable dual inline memory modules.

13. A method according to claim 8, wherein the memory controller is programmed to have different clock-to-output delays based on the number of memory modules installed in the system.

14. A memory subsystem for use in a data processing system having a clock generator for generating a system clock signal, the memory subsystem comprising:
    a plurality of memory modules for storing data; and
    a memory controller for receiving the system clock signal and coupled to the memory modules for outputting memory address and control signals to said modules, wherein the memory controller is programmable to have different clock-to-output delays, by delaying address and control signals to the memory unit, based on the memory loading installed in the system.

15. A memory subsystem according to claim 14, wherein the memory controller includes:
    means for generating a series of memory address and control signals in response to receiving the system clock signal, and for outputting the memory address and control signals to the memory modules; and
    programmable means for determining time delays between the time the memory controller receives the system clock signal and the time the memory means outputs the memory address and control signals.

16. A memory subsystem according to claim 15, wherein the memory controller is programmed by computing the load of each of the memory modules.

17. A memory subsystem according to claim 16, wherein the memory unit has a plurality of slots for receiving the memory modules, and the load of the memory modules is computed by addressing each memory slot to determine if memory is plugged in, to determine the number and type of modules the controller needs to drive.

18. A memory subsystem according to claim 14, wherein the memory modules are pluggable dual inline memory modules.

19. A memory subsystem according to claim 12, wherein the memory controller is programmable to have different clock-to-output delays based on the number of memory modules installed in the system.

\* \* \* \* \*